United States Patent [19]

Rover

[11] Patent Number: 5,309,281
[45] Date of Patent: May 3, 1994

[54] FOLDABLE STEREOSCOPIC VIEWER

[76] Inventor: Chris R. Rover, Lambs La., Cresskill, N.J. 07620

[21] Appl. No.: 978,717

[22] Filed: Nov. 19, 1992

[51] Int. Cl.[5] ............................................. G02B 27/22
[52] U.S. Cl. .................................... 359/474; 359/476
[58] Field of Search ............................... 359/474, 476

[56] References Cited

U.S. PATENT DOCUMENTS 2,789,460  4/1957  Kaufman .............................. 359/474

*Primary Examiner*—Scott J. Sugarman
*Attorney, Agent, or Firm*—Anthony F. Cuoco

[57] ABSTRACT

A frame supports stereoscopically paired pictures and a pair of lenses for viewing the pictures. The frame is foldable to vary the distance between the lenses and the pictures so that an observer can focus on the pictures in accordance with the observer's particular optical characteristics, whereby a three-dimensional picture image is viewed. The distance between the viewing lenses can be varied to accommodate variations in the distance between the eyes of different observers. The entire viewer can be folded flat for storage and shipping convenience.

10 Claims, 5 Drawing Sheets

FOLDABLE STEREOSCOPIC VIEWER

BACKGROUND OF THE INVENTION

This invention relates to stereoscopic viewers of the type having two eyepieces for helping an observer to combine the images of two pictures taken from laterally spaced points of view a little way apart and to thus provide a three-dimensional effect. More particularly, this invention relates to stereoscopic viewers of the type described which are foldable so as to facilitate storage and the like.

A stereoscopic viewer is an optical instrument for obtaining from two pictures, such as photographs made from points of view typically corresponding to the position of an observer's two eyes, a single three-dimensional image by means of two lenses used one with each eye and set to deflect rays coming from corresponding points in the two pictures in such a manner as to produce the effect of coming from a single point.

Stereoscopic viewers have long been in existence. Older viewers have been generally of a rigid and cumbersome construction, while modern viewers are more compact and are capable of being folded. Some of these modern viewers are shown and described in Catalog No. 14 published in 1992 by Reel 3-D Enterprises, Inc., P.O. Box 2368, Culver City, Calif. 80231.

However, none of the prior art viewers have the particular structural features of the present invention, as will be discerned from the description thereof which follows.

SUMMARY OF THE INVENTION

This invention contemplates a stereoscopic viewer of paperboard or plastic construction and including a hexagonal frame. The frame has substantially longitudinally disposed front and rear panels which are coupled on each of their corresponding sides by a pair of substantially longitudinally disposed side panels. Each of the panels is creased so that the frame folds. Each of the front and rear panels has an integral member extending substantially transversely across the top thereof. The front panel member carries a pair of eyepieces in spaced relation and the rear panel member carries rails for supporting a pair of pictures. A creased bracing member is coupled to the front and rear panels. The eyepieces and the pictures are in viewing alignment. The arrangement is such that the frame is foldable so that the front and rear panel members are displaceable away from and toward each other via the creases in the panels and the crease in the bracing member for allowing an observer to focus on the pictures in accordance with the observer's particular optical characteristics, to present a three-dimensional image to the observer. In one form of the invention the eyepieces on the front panel member are in fixed spaced relation, and in another form said spaced relation is adjustable to accommodate differences in the interocular spacing of the eyes of different observers.

DETAILED DESCRIPTION OF THE INVENTION

Figure 1:
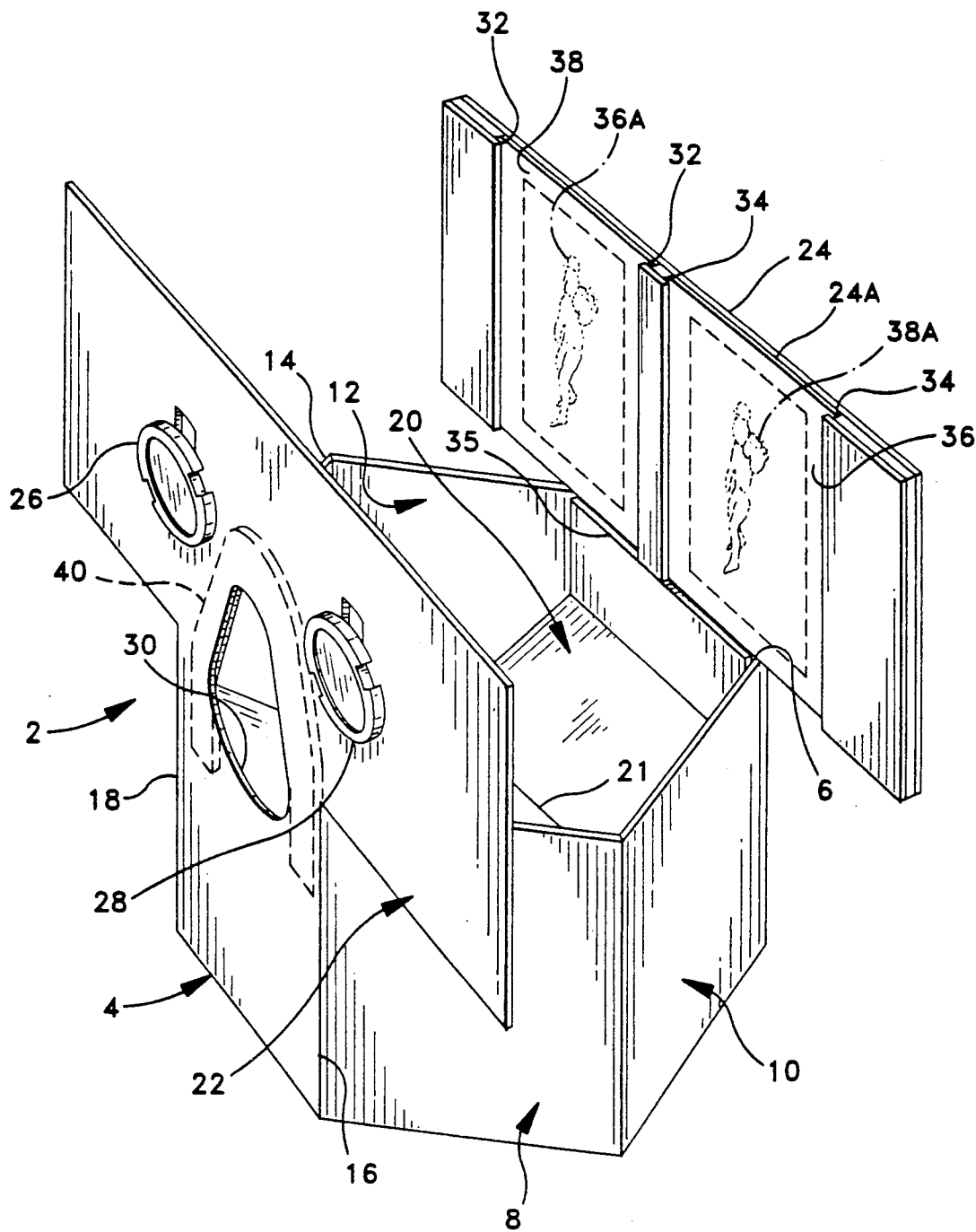
FIG. 1 is a perspective representation illustrating the features of the invention, and wherein the invention is shown in one usable form.
Figure 2:
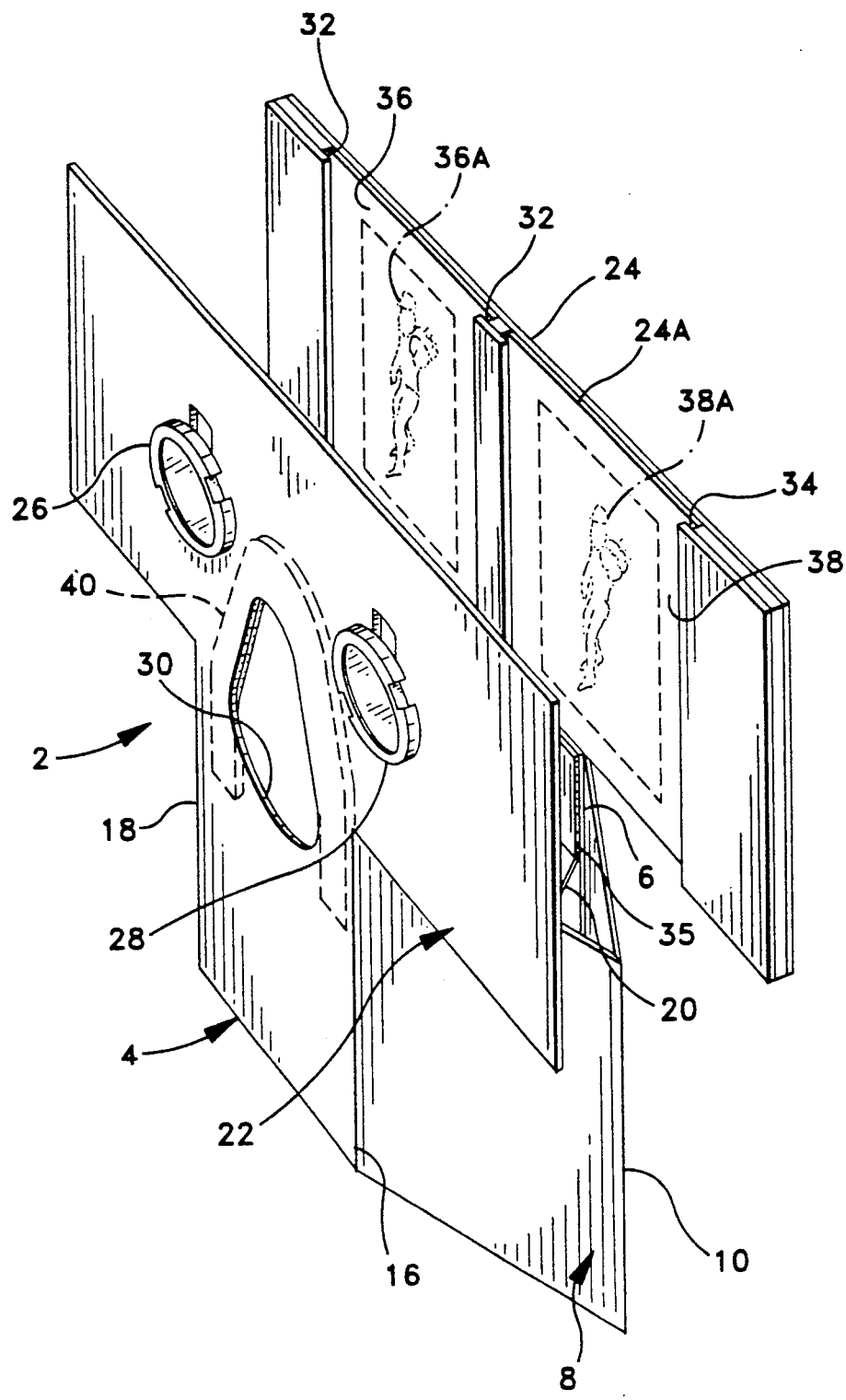
FIG. 2 is a perspective representation illustrating the features of the invention and wherein the invention is shown in another usable form.

With reference to FIGS. 1 and 2, a continuous frame in the form of a regular hexagon is designated by the numeral 2. Frame 2 has six substantially longitudinally extending panels including a front panel 4, a rear panel 6, a pair of side panels 8 and 10 and another pair of side panels 12 and 14. Panels 8 and 10 couple corresponding sides of panels 4 and 6 and panels 12 and 14 couple opposite corresponding sides of panels 4 and 6. Each of the panels 4, 6, 8, 10, 12 and 14 have creased sides such as 16 and 18 where panel 4 joins adjacent panels 8 and 14, whereby frame 2 is foldable so that panels 4 and 6 are displaceable away from and toward each other, and so that the frame is foldable flat.

A bracing member 20 is supported on the inner surfaces of panels 4 and 6 (not otherwise shown), respectively, and is creased as at 21 so as to be foldable with frame 2.

Panel 4 has an integral member 22 extending substantially transversely across the top and beyond the sides thereof, and panel 6 has an integral member 24 extending substantially transversely across the top and beyond the sides thereof.

Transversely extending member 22 carries a pair of eyepieces 26 and 28 disposed in spaced relation to each other and an aperture 30 for accepting the nose of an observer extends upwardly from the top of panel 4 to transversely extending member 22 between eyepieces 26 and 28. This arrangement enhances the use of the viewer as will be readily appreciated.

Transversely extending member 24 includes on its inner surface 24A a pair of substantially parallel rails 32 in longitudinal spaced relation near one end thereof and another pair of substantially parallel rails 34 in like spaced relation near the opposite end. Rails 32 and 34 receive paired picture or photograph cards 36 and 38, respectively for stereoscopic viewing of pictures 36A and 38A through eyepieces 26 and 28. The arrangement is such that the pictures and eyepieces are in viewing alignment. It will be understood that the configuration of the invention including end 35 of bracing member 20 forms a ledge which prevents picture cards 36 and 38 from dropping through rails 32 and 34.

The inner surface of front panel 4 and the inner surface of member 22 have a reinforcing member 40 secured thereto conforming substantially to the shape of nose aperture 30. This feature of the invention adds strength to the nose aperture so as to increase the useful life of the device, as will now be understood.

With particular reference to FIG. 1, frame 2 is shown as being partially folded in one usable form, as accomplished by the structural features of the invention, whereby the optical characteristics of a particular observer are accommodated.

With particular reference to FIG. 2, frame 2 is shown folded in another usable form and to a greater extent to accommodate the optical characteristics of another observer.

Thus, the distance between member 22 which carries eyepieces 26 and 28 and member 24 which carries picture cards 36 and 38 can be adjusted in accordance with the particular optical characteristics involved so as to accommodate a variety of observers in a simple manner, whereby viewing pictures 36A and 38A via lenses 26 and 28 in three-dimensional or stereoscopic form is enhanced.

In this regard, it will be appreciated that pictures 36A and 38A are made from points of view typically corresponding to the position of an observer's two eyes, whereby a single three-dimensional image is viewed by means of eyepieces 26 and 28 used one with each eye of a viewer and set to deflect rays coming from corresponding points in the two pictures 36A and 38A so as to produce the effect of coming from a single point. To put it another way, eyepieces 26 and 28 help the observer to combine the images provided by pictures 36A and 38A which are taken from laterally spaced points of view to thus provide the desired stereoscopic or three-dimensional effect.

Figure 3:
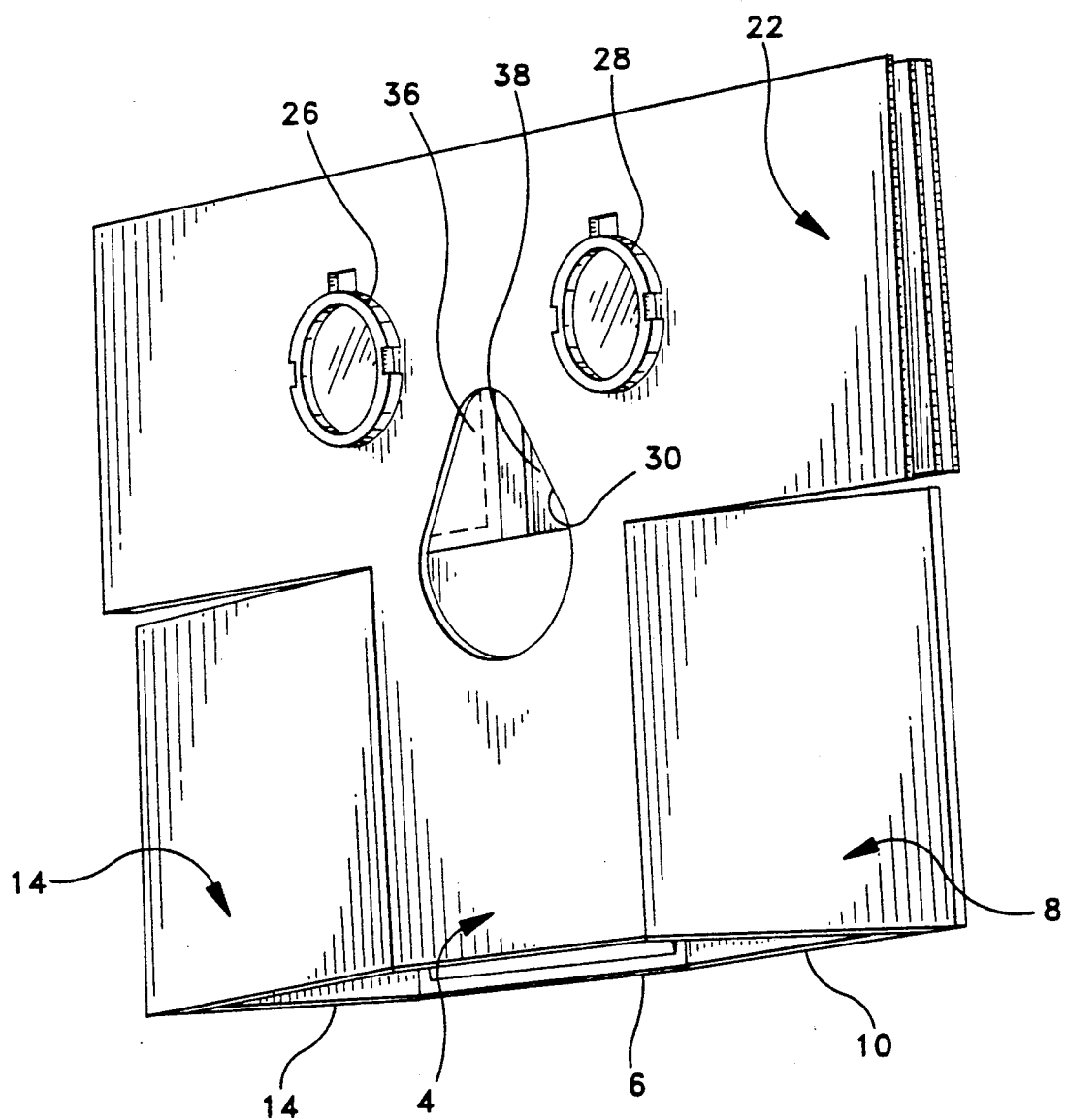
FIG. 3 is a perspective representation illustrating the invention in substantially flat, folded, storage form.

With particular reference to FIG. 3, frame 2 is shown folded substantially flat as accomplished via the creases such as 16 and 18 in the frame panels and crease 21 in bracing member 20. The frame is thus adaptable for storage and/or packing and shipping, as the case may be.

In the embodiment of the invention shown in FIGS. 1 and 2, eyepieces 26 and 28 are in fixed spaced relation. It will be recognized as desirable that means be provided for varying this fixed spaced relation to accommodate differences in the interocular spacing between the eyes of different observers, as is likely to occur. The present invention accommodates this feature as illustrated in FIGS. 4 and 5 to be next described.

Figure 4:
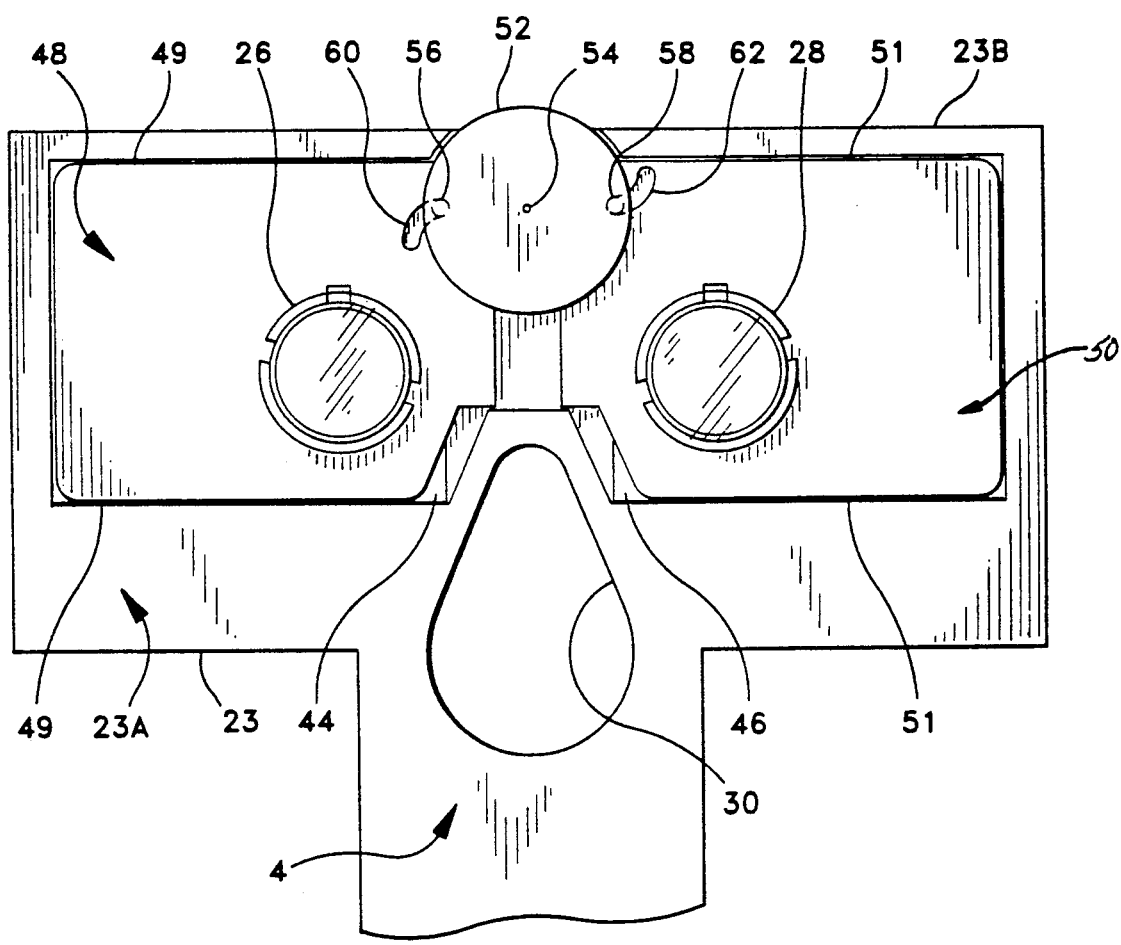
FIGS. 4 and 5 are plan views illustrating a form of the invention wherein the eyepieces thereof are in adjustable spaced relation.
Figure 5:
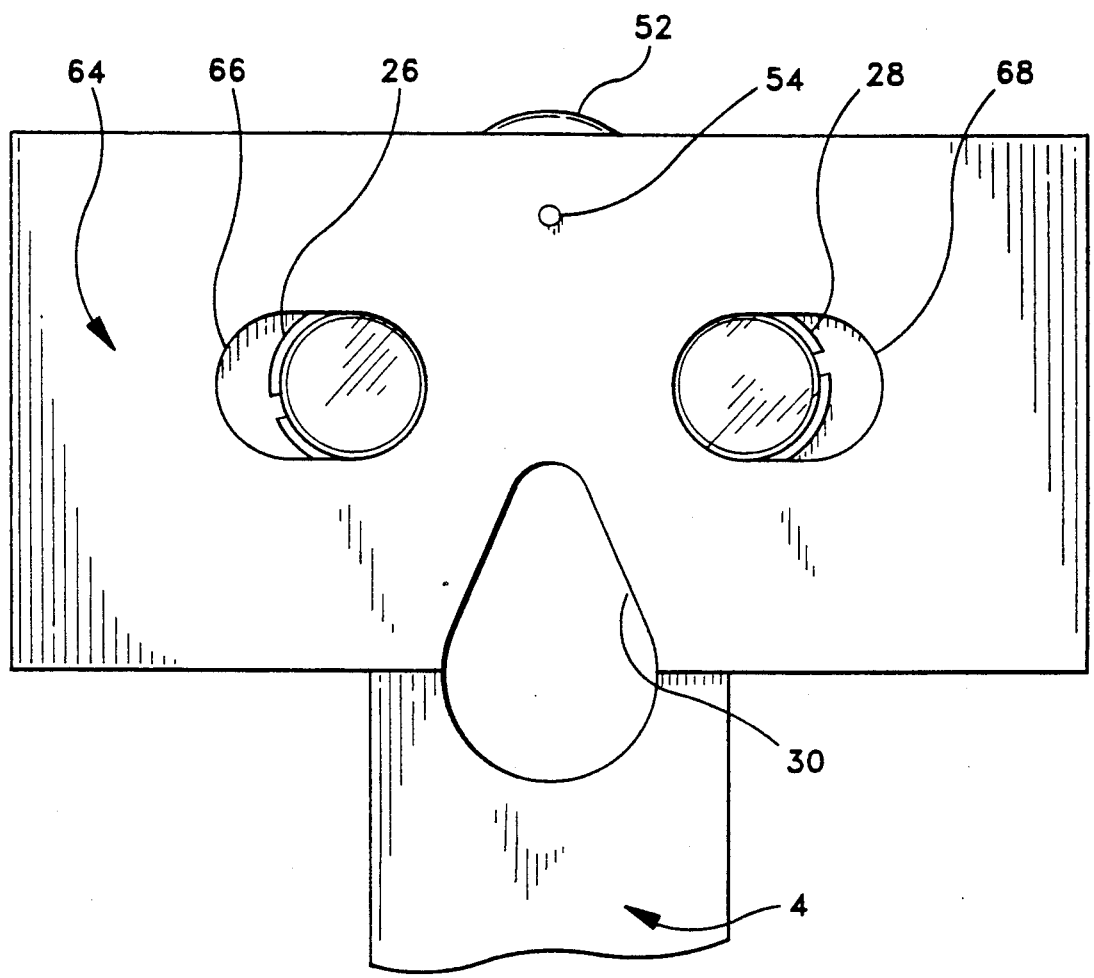

With reference first to FIG. 4, member 22 extending transversely across the top and beyond the sides of panel 4 as shown in FIGS. 1 and 2 is modified to accommodate the aforementioned feature of the invention and the modified member is designated by the numeral 23.

Member 23 carries windows 44 and 46, one on each side of nose aperture 30. A plate 48 which carries eyepiece 26 slides in transversely extending longitudinally spaced tracks 49 in window 44 and a plate 50 which carries eyepiece 28 slides in transversely extending longitudinally spaced tracks 51 in window 46. Tracks 49 and 51 are on the outer surface 23A of member 23.

An operating wheel 52 is rotatably mounted near the top of outside surface 23A of member 23 between windows 44 and 46 by a suitable pivot member or the like 54 and overlaps plates 48 and 50. Wheel 52 carries an inwardly extending pin 56 near its circumference and carries another inwardly extending pin 58 near its circumference and generally opposite pin 56. Pin 56 engages an arcuate slot 60 in plate 48 and pin 58 engages an arcuate slot 62 in plate 50. Arcuate slot 60 extends in one direction and arcuate slot 62 extends in a generally opposite direction. The arrangement is such that when wheel 52, which protrudes above the upper edge 23B of member 23, is rotated in one and an opposite direction as by an observer, pins 56 and 58 in engagement with their respective slots 60 and 62 are effective for displacing or sliding plates 48 and 50 away from or toward each other as the case may be, whereby the transverse distance between eyepieces 26 and 28 is varied or adjusted to accommodate the eye spacing of a particular observer.

With reference to FIG. 5, a cover plate 64 is disposed over front surface 23A of horizontal member 23 and is suitably affixed thereto so that plates 48 and 50 are retained in window tracks 49 and 51, respectively, and pins 56 and 58 remain engaged with slots 60 and 62, respectively.

Cover plate 64 has openings 66 and 68 which are generally oval in shape so as to accommodate the several adjusted positions of lenses 26 and 28. With the arrangement described, the observer's eyes view pictures 36A and 38A shown in FIGS. 1 and 2 through lenses 26 and 28 within oval openings 66 and 68.

Except for reinforcing member 40 and wheel 52, which may both be of a suitable plastic material, and lenses 66 and 68 which are of a suitable optical material, the entire stereoscopic viewer of the invention as described is constructed of a suitable paperboard or plastic material which is foldable to adjust the distance between the viewing lenses and the pictures to be viewed for focusing on the pictures so as to accommodate the optical characteristics of a particular observer for providing a three-dimensional or stereoscopic image. Further, the viewer is foldable flat so as to be easily stored and/or packed and shipped, as is desirable.

Pivot member 54 and pins 56 and 58 may be loose fitting grommet-like members for preventing possible disengagement of members 56 and 58 from the respective arcuate slots 60 and 62, as will be recognized by those skilled in the art.

The invention as described herein is useful for a variety of stereoscopic viewing applications, and has been found particularly useful for stereoscopic viewing of baseball cards and other sports cards and the like, as will be readily appreciated.

With the above description of the invention in mind, reference is made to the claims appended hereto for a definition of the scope of the invention.

What is claimed is:

1. A foldable stereoscopic viewer, comprising:
 a continuous frame in the form of a regular hexagon including six substantially longitudinally extending panels each of which is creased at its opposite sides so that the frame is foldable outwardly and inwardly;
 the plurality of longitudinally extending panels including a front panel and a rear panel;
 a first member having an inner and outer surface and integral with the front panel, and extending substantially transversely across the top and beyond the opposite sides thereof, and carrying a pair of eyepieces disposed in spaced relation to each other;
 a second member having an inner and outer surface and integral with the rear panel, and extending substantially transversely across the top and beyond the opposite sides thereof, and carrying a pair of stereoscopically paired pictures, said pictures and eyepieces being in viewing alignment;
 the first and second members being displaced away from and toward each other when the frame is folded outwardly and inwardly, respectively, for allowing an observer to focus on the stereoscopically paired pictures in accordance with the observer's particularly optical characteristics, to present a three-dimensional image to the observer;
 the front and rear panels each having an inner and outer surface;
 a bracing member having one end secured to the inner surface of the front panel and an opposite end secured to the inner surface of the rear panel;
 the bracing member being creased so as to be foldable with the frame;

the inner surface of the second member including a first pair of parallel rails in longitudinal spaced relation near one end thereof and a second pair of parallel rails in like spaced relation near the opposite end;

each of the first and second pairs of parallel rails receiving one of the stereoscopically paired pictures; and the opposite end of the bracing member secured to the inner surface of the rear panel forming a ledge which prevents the stereoscopically paired pictures from dropping through the respective pairs of rails receiving said pictures.

2. A foldable stereoscopic viewer as described by claim 1, wherein:

the front panel and the first member have an aperture extending therethrough for accepting the nose of a viewer.

3. A foldable stereoscopic viewer as described by claim 2, including:

a reinforcing member secured to the inner surface of the front panel and the inner surface of the first member, and conforming substantially to the shape of the nose aperture.

4. A foldable stereoscopic viewer as described by claim 1, wherein:

the eyepieces of the pair of eyepieces carried by the first member are disposed in fixed spaced relation to each other.

5. A foldable stereoscopic viewer as described by claim 1, wherein:

the inner surface of the second member includes a first pair of parallel rails in longitudinal spaced relation near one end thereof and a second pair of parallel rails in like spaced relation near the opposite end; and each of the first and second pairs of parallel rails receiving one of the stereoscopically paired pictures.

6. A foldable stereoscopic viewer, comprising:

a continuous frame in the form of a regular hexagon including six substantially longitudinally extending panels each of which is creased at its opposite sides so that the frame is foldable outwardly and inwardly;

the plurality of longitudinally extending panels including a front panel and a rear panel;

a first member having an inner and outer surface and integral with the front panel, and extending substantially transversely across the top and beyond the opposite sides thereof, and carrying a pair of eyepieces disposed in adjustable spaced relation to each other to accommodate the difference in eye spacing of different observers;

a second member having an inner and outer surface and integral with the rear panel, and extending substantially transversely across the top and beyond the opposite sides thereof, and carrying a pair of stereoscopically paired pictures, said pictures and eyepieces being in viewing alignment; and the first and second members being displaced away from and toward each other when the frame is folded outwardly and inwardly, respectively, for allowing an observer to focus on the stereoscopically paired pictures in accordance with the observer's particularly optical characteristics, to present a three-dimensional image to the observer.

7. A foldable stereoscopic viewer as described by claim 6, wherein:

the front panel and the first member have an aperture extending therethrough between the pair of eyepieces for accepting the nose of an observer.

8. A foldable stereoscopic viewer as described by claim 6, including:

a first window on one side of the first member and a second window on the opposite side of said first member;

the first window including a first pair of transversely extending longitudinally spaced tracks and the second window including a second pair of transversely extending longitudinally spaced tracks, said first and second tracks being on the outer surface of the first member;

a first plate disposed in the first pair of tracks and displaceable therealong, said first window carrying one of the pair of eyepieces;

a second plate disposed in the second pair of tracks and displaceable therealong, said second plate carrying the other of the pair of eyepieces; and means arranged with the first and second plates for displacing said plates for adjusting the spaced relation of the pair of eyepieces.

9. A foldable stereoscopic viewer as described by claim 8, wherein said means arranged with the first and second plates for adjusting the spaced relation of the pair of eyepieces includes:

a wheel rotatably mounted to the first member on the front surface thereof between the first and second windows, said wheel overlapping the first and second plates and extending beyond the upper edge of the first member so as to be accessible to the observer;

said wheel carrying a first inwardly extending pin near its circumference and a second inwardly extending pin near its circumference and generally opposite said first inwardly extending pin;

the first plate having a first arcuate slot extending in one direction;

the second plate having a first arcuate slot extending in a generally opposite direction; and the first pin engaging the first slot and the second pin engaging the second slot, whereby the first and second plates are displaced away from and toward each other when the observer rotates the wheel in one direction and an opposite direction for adjusting the spaced relation between the eyepieces.

10. A foldable stereoscopic viewer as described by claim 9, including:

a cover disposed over the outer surface of the first member for retaining the first and second plates in the first and second pairs of transversely extending longitudinal rails, respectively, and for retaining the first and second pins in the first and second slots, respectively.

* * * * *